(12) United States Patent
Bice et al.

US009122720B2

(10) Patent No.: US 9,122,720 B2
(45) Date of Patent: Sep. 1, 2015

(54) ENRICHING DATABASE QUERY RESPONSES USING DATA FROM EXTERNAL DATA SOURCES

(75) Inventors: Anthony Nino Bice, Seattle, WA (US); David Robinson, Snohomish, WA (US); Hariharan Sivaramakrishnan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 391 days.

(21) Appl. No.: 13/159,666

(22) Filed: Jun. 14, 2011

(65) Prior Publication Data

US 2012/0323947 A1 Dec. 20, 2012

(51) Int. Cl.
*G06F 17/30* (2006.01)

(52) U.S. Cl.
CPC ...... *G06F 17/30418* (2013.01); *G06F 17/3043* (2013.01)

(58) Field of Classification Search
CPC .............. G06F 17/30427; G06F 17/30043; G06F 17/30864
USPC .................................. 707/769, 760
See application file for complete search history.

(56) References Cited

U.S. PATENT DOCUMENTS

| | | | | |
|---|---|---|---|---|
| 5,819,273 | A * | 10/1998 | Vora et al. ........................... | 1/1 |
| 5,913,214 | A * | 6/1999 | Madnick et al. ...................... | 1/1 |
| 6,343,287 | B1 * | 1/2002 | Kumar et al. .......... | 707/999.002 |
| 6,618,822 | B1 | 9/2003 | Loaiza et al. | |
| 6,928,425 | B2 * | 8/2005 | Grefenstette et al. ......... | 715/209 |
| 7,168,034 | B2 | 1/2007 | Hennings et al. | |
| 7,177,874 | B2 * | 2/2007 | Jardin ........................... | 707/714 |
| 7,472,349 | B1 * | 12/2008 | Srivastava et al. ..... | 707/999.001 |
| 7,571,069 | B1 | 8/2009 | Farkas | |
| 7,647,349 | B2 | 1/2010 | Hubert | |
| 7,716,240 | B2 * | 5/2010 | Lim .............................. | 707/781 |
| 7,739,223 | B2 * | 6/2010 | Vaschillo et al. ...... | 707/999.101 |
| 8,103,681 | B2 * | 1/2012 | Littlejohn et al. ............ | 707/754 |
| 2002/0023091 | A1 * | 2/2002 | Silberberg et al. ........ | 707/103 Y |
| 2002/0120618 | A1 | 8/2002 | Ushijima et al. | |
| 2003/0158767 | A1 | 8/2003 | Nwafor et al. | |
| 2005/0044064 | A1 | 2/2005 | Haase | |
| 2006/0271557 | A1 * | 11/2006 | Harward et al. ................. | 707/10 |
| 2008/0228716 | A1 * | 9/2008 | Dettinger et al. ................. | 707/3 |
| 2008/0235288 | A1 | 9/2008 | Ben Harush | |
| 2009/0049200 | A1 * | 2/2009 | Lin et al. ........................ | 709/246 |
| 2009/0083408 | A1 * | 3/2009 | Hecht et al. .................... | 709/223 |
| 2009/0234823 | A1 * | 9/2009 | Wong ................................ | 707/4 |
| 2009/0307054 | A1 * | 12/2009 | D'Imporzano et al. ......... | 705/10 |

(Continued)

OTHER PUBLICATIONS

Data Cleansing & Enrichment, SAS, Apr. 7, 2011 (retrieval date).

(Continued)

*Primary Examiner* — Cam-Y Truong
(74) *Attorney, Agent, or Firm* — Brian Haslam; Mike Allen; Micky Minhas

(57) ABSTRACT

The subject disclosure is directed towards enriching database query responses using data from external data sources. When processing a database query seeking enriched data from an external data source, a request is communicated to the external data source based on the database query. An enriched database query response is generated based on data provided by the external data source. The enriched database query response may be combined with data returned via an internal database query operation, and/or inserted into a local database table.

20 Claims, 8 Drawing Sheets

(56) References Cited

U.S. PATENT DOCUMENTS

2011/0010379 A1* 1/2011 Gilderman et al. ........... 707/759
2013/0104251 A1 4/2013 Moore et al.

OTHER PUBLICATIONS

Service-oriented Data Quality Engineering and Data Publishing in the Cloud, Marco Comerio et al., (2010).
SDET: A Semantic Data Enrichment Tool Application to Geographical Databases, Khaoula Mahmoudi et al.. 2006.
Oracle Product Data Quality, Apr. 7, 2011 (retrieval date), http://www.oracle.com/partners/en/most-popular-resources/059010.html.
Semantic Lenses: Seamless Augmentation of Web Pages with Context Information from Implicit Queries, Martin Rotard et al. (Dec. 22, 2006).
"International Search Report", Mailed Date: Feb. 21, 2013, Application No. PCT/US2012/040947, Filed Date: Jun. 5, 2012, pp. 1-10.
"Office Action Issued in U.S. Appl. No. 14/166,437", Mailed Date: Nov. 5, 2014, 28 Pages.
"Office Action Issued in U.S. Appl. No. 14/166,442", Mailed Date: Nov. 6, 2014, 12 Pages.
"Supplementary Search Report Issued in European Patent Application No. 12800711.9", Mailed Date: Mar. 25, 2015, 5 Pages.

* cited by examiner

ENRICHING DATABASE QUERY RESPONSES USING DATA FROM EXTERNAL DATA SOURCES

CROSS REFERENCE TO RELATED APPLICATIONS

This application is related to U.S. patent application Ser. No. 13/159,654, entitled "RECOMMENDING DATA ENRICHMENTS," filed Jun. 14, 2011 and U.S. patent application Ser. No. 13/159,658, entitled "DATA CUSTODIAN AND CURATION SYSTEM," filed Jun. 14, 2011.

BACKGROUND

Software application operation depends on efficient computing resource usage. Hence, supporting data storage and processing mechanisms are needed for facilitating a positive user experience.

Such software applications include database applications that access an enterprise's internal database comprising structured data records (e.g., table data). The database applications are built on a development platform for a database management system. When a user communicates a database query, a database application accesses the internal database and (ordinarily) provides a response comprising table data that matches the database query.

In addition to internal data, users sometimes want to access data from an external data source or sources, such as to view such data along with retrieved internal database data. In order to do so, an application (data source provider) needs to be developed that understands how to communicate with each external source, e.g., its authentication model, communication protocols (connection strings) and/or any other information such as billing requirements. Developing such an application is beyond the ability and/or too time consuming for a typical query author who generally just wants to analyze the data.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards maintaining a translation mechanism that allows data retrieved from internal database queries to be enriched with data from external data sources, using straightforward query commands. In one aspect, the translation mechanism facilitates the retrieval of external data because separate providers are not needed for different external data sources. There is no need for a query author or application developer to deal with how database queries are authenticated, how table data is imported from the external data sources or how a user is billed for access, for example.

In another aspect, an enrichment server uses the translation mechanism to combine an internal database with table data from one or more external databases. Because the internal database may include non-public (i.e., private) data, the enrichment server enables a seamless augmentation of the non-public data with various public information.

In one aspect, the enrichment server extracts parameters from the database query from which an entity is identified. The entity includes a grouping of data types as components whose values are requested by a user. The parameters also include values that are used as search criteria or the like for selecting data from the external data sources. Using these parameters, the translation mechanism initiates appropriate native function calls of a protocol for requesting data from the external data sources.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
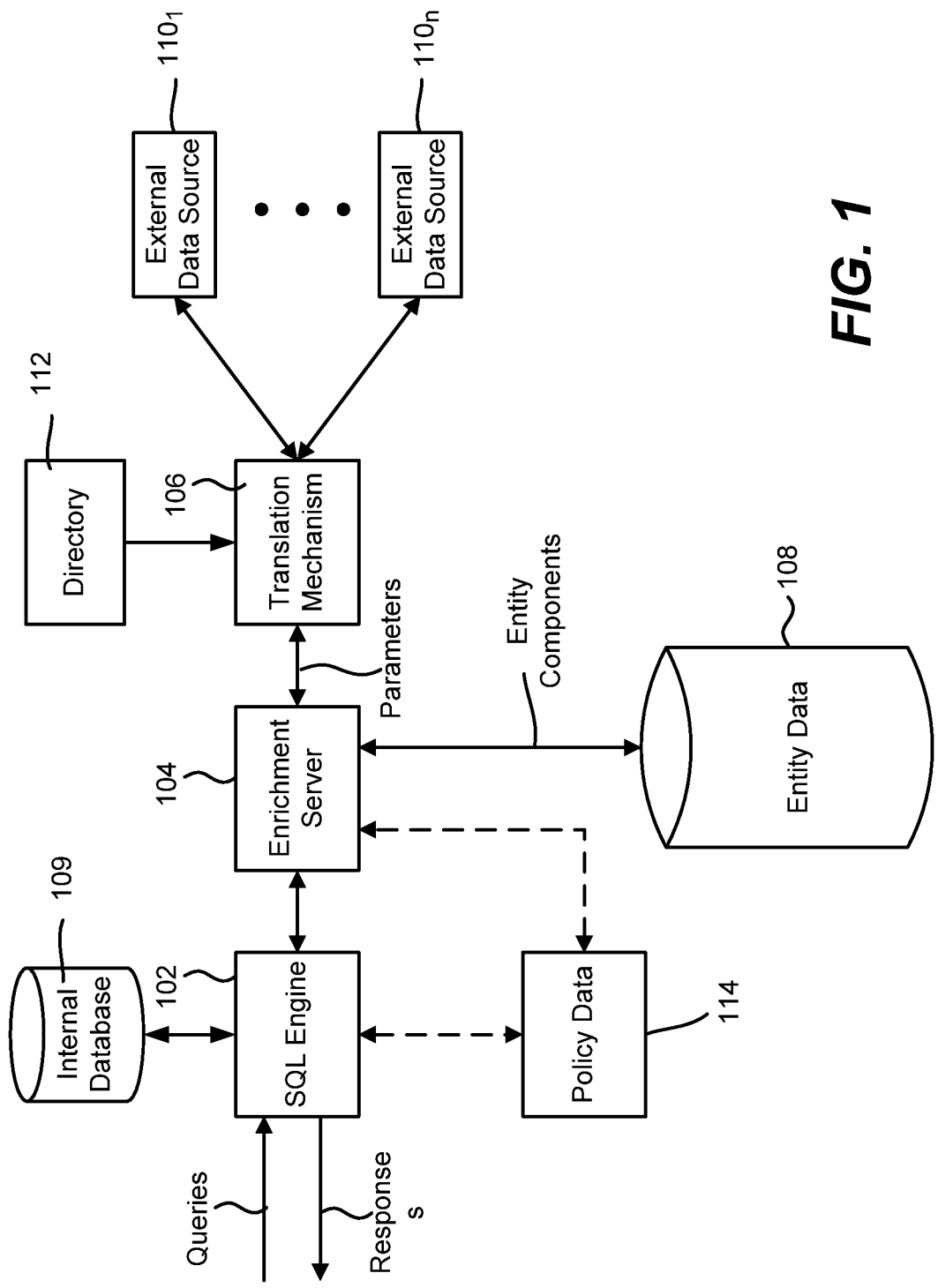
FIG. 1 is a block diagram illustrating an exemplary system for enriching database query responses using data from external data sources.

Various aspects of the technology described herein are generally directed towards enriching database query responses using data that is extracted from external data sources. A database query includes one or more parameters specifying one or more criteria for selecting data from the external data sources. One exemplary parameter includes an entity identifier (e.g., a name) of a group of data types. Each data type may include one or more other data types. Other exemplary parameters include one or more values for one or more data types of the group of data types. Some other exemplary parameters may be contextual parameters that limit the values returned by the external data source to a particular time and/or location, for example. Because enriched responses to the database query include table data, the group of data types defines one or more columns, while the one or more values define one or more rows. In one exemplary implementation, column data within each row of the table data corresponds with the one or more values.

In one exemplary implementation, the database query pertains to enriching company data with various information exemplified as financial information, such as stock prices, employee statistics, earnings reports, market capitalization values ("market caps"), recent stock ticker prices and/or the like. One or more external data sources, such as financial news media, stock markets, search engines and/or the like, provide the various financial information for the one or more company names in response to native function calls or queries ("requests") requesting such data. Data types that define portions of the various financial information constitute an entity. Hence, the database query includes an entity name and one or more company names as parameters.

An exemplary entity includes a number of components (i.e., data types), including components representing a number of employees, a market cap and a stock price. Many other components may be included in the entity, e.g., company officers, gross sales, state of incorporation, years in existence, and so forth. In order to access such data from an external source, a translation mechanism provides one or more exemplary parameters, including any of the entity components (e.g., identified in a user query), and instructs connectivity software running at an appropriate external data source to execute a native function. Consequently, the connectivity software returns values for the number of employees, the market cap and/or the stock price, for example, if those are specified.

By way of example, consider an enterprise with a "companies" table named C, containing rows of company names with a column of zipcode data (among likely many other columns) for various rows of companies. Consider that the internal database does not include stock ticker data or the number of employees for each company, but that such information is available from external sources. To view data formatted as name, zipcode, ticker and num_employees, heretofore a custom application (provider) was needed to merge the internal query results with the data from external sources. With data enrichment, a user need only specify pre-defined entity (e.g., "CompanyFinancial") that includes the appropriate components such as ticker, num_employees, market_cap, and so forth, and submit an appropriate query:

SELECT name, zipcode, ticker, num_employees
FROM Companies c
ENRICH on CompanyFinancial (c.name)

The first line specifies the columns of data to retrieve, of which name and zipcode are available from the enterprise's internal database, while ticker and num_employees are available from an external source (or sources). The second line indicates the table to enrich. The third line is the data enrichment, which specifies the predefined entity "CompanyFinancial" that includes the components for the external data, with the c.name parameter specifying which companies to return external data for, namely those in the "Companies c" table. Note that the user can view the "CompanyFinancial" entity to determine that the needed data columns (ticker and num_employees in this example) will be satisfied by specifying this entity.

If one of the entity components, such as the number of employees, is not available (or remains unknown) from one data source, the translation mechanism may instruct connectivity software running at another external data source to execute a different native function in order to access the unknown entity component. Hence, the translation mechanism replaces the need for one or more data separate providers to communicate with each type of external data source.

Because an external data source may utilize a unique or proprietary protocol (e.g., Application Programming Interface (API)) to communicate data, a translation mechanism accesses configuration data (e.g., maintained in a directory) to configure a function call or remote query that is compatible with such a protocol. The function call or remote query includes criteria for identifying some of the various information (e.g., financial information) to use for enrichment. After the translation mechanism initiates the function call or query, the external data source returns data matching such criteria. Because the data is arranged in accordance with a native format, the translation mechanism converts the data into compatible table data.

For example, the translation mechanism may call a function requesting a particular company stock price from a stock market database. Such a call includes a specific company name (or symbol) along with some indication (e.g., an attribute) indicating that the stock price is requested. The stock price is communicated to the translation mechanism in a native format. The translation mechanism extracts the stock price and inserts the stock price in the table data that forms a portion of an enriched database query response. In turn, the table data may be used to populate one or more columns of an internal database of the enterprise's data, including private data.

As mentioned above, some of the exemplary parameters may include contextual parameters that specify a location and/or time value. The translation mechanism uses the contextual parameters to identify data that corresponds with the location and/or the time value from the external data source. For example, the translation mechanism uses a specific date/time as a native function call parameter to select a stock price at the specific data/time. As another example, the translation mechanism initiates another native function call for computing an average stock price over a time interval (e.g., a number of days).

In an alternate exemplary implementation, the database query includes parameters for enriching private company data with various news information at or near a particular geographic location, which may be represented as a physical location (e.g., geographic or geodetic coordinates) or an Internet resource location (e.g., an Internet Protocol (IP) address). For example, the translation mechanism may initiate a native function call for company-related news within a range of a certain Global Positioning System (GPS) location. The native function call may further request company-related news for a particular time period, such as historical news or current news.

FIG. 1 is a block diagram illustrating an exemplary system for enriching database query responses using data from external data sources. The exemplary system (e.g., implemented in one server among many servers) may support various database services. The exemplary system includes various example components, such as a SQL engine 102, an enrichment server 104 and a translation mechanism 106 as described herein. The enrichment server 104 may be one or more servers comprising an enrichment service.

The SQL engine 102 receives database queries including various parameters (i.e., sometimes referred to as enrichment parameters), such as an entity identifier. The enrichment server 104 may access entity data 108 and verify that each component in the query is available from internal data 109 or via an entity that matches the entity identifier. For external components of the entity, the enrichment server 104 uses the translation mechanism 106 to access data at one or more external data sources $110_1$-$110_n$ and select values for various entity components. These values may be stored in a form of table data within an enriched database query response that is communicated to the SQL engine 102 via the enrichment server 104. In one implementation, the SQL engine 102 is configured to populate portions (e.g., one or more columns of table data) of an internal database 109 with the enriched database query response.

In order to know how to communicate with each external source, the translation mechanism accesses a directory 112 with information maintained for each data source that corresponds to an entity component. For example, the directory 112 has entries for each external data source $110_1$-$110_n$, with each entry defining a protocol for communicating data with the external data source including native function calls, data formats, billing procedures, security credentials and/or the like. As can be readily appreciated, instead of or in addition to a directory, any suitable mechanism may be used to determine such information, including maintaining the protocol/related data in another data store, hard coding the protocol/related data into the translation mechanism and so forth.

The enrichment server 104 and the translation mechanism 106 may be stored and operated at a local computer/network to control access to local and/or networked databases. Alternatively, the enrichment server 104 and/or the translation mechanism 106 may be included in cloud computing applications where the local computer primarily functions as an interface for a share of computing resources at a remote server data center. While the cloud computing applications store the table data in an internal database, the internal database is not stored at the local computer, for example.

According to one example implementation, the enrichment server 104 may utilize a policy 114 to map each of the various entity components to an appropriate external data source amongst the plurality of data sources $110_1$-$110_n$. For example, the policy 114 may include preferences associated with selecting the appropriate external data source. As a more particular example, the policy 114 may indicate a preference for free data services over commercial/paid data services, whereby the enrichment server 104 selects a commercial/paid data service only if a free option does not exist; a price limit may be specified in the policy as well. As another example, the policy 114 may assign a high priority to a specific data source. Unless a value for an entity component cannot be retrieved or computed, the enrichment server 104 uses that specific data source to access data for enriching the database query response.

According to one exemplary implementation, the plurality of external data sources $110_1$-$110_n$ include any type of remote or Internet data service (e.g., data feeds, reports, commercial or free databases, search engines and/or the like) from which table data is retrieved and then used to generate an enriched database query response. Each of the external data sources $110_1$-$110_n$ implements a particular protocol that allows other computer systems to access the table data. The particular protocol may include an Application Programming Interface in which calling certain functions retrieves portions of the table data. Because the certain functions are native to the particular, they may be referred to as native functions.

Input parameters for the native functions identify the portions of the table data to be returned. For example, the translation mechanism 106 calls a function with input parameters specifying a company name and a requested data type, such as a current stock price. One of the external data sources searches a database that provides stock prices and returns table data comprising the company name and the current stock price. As another example, the translation mechanism 106 may request a stock price for a previous day, such as yesterday. In addition to the company name, the input parameters include a parameter specifying a day.

Figure 2:
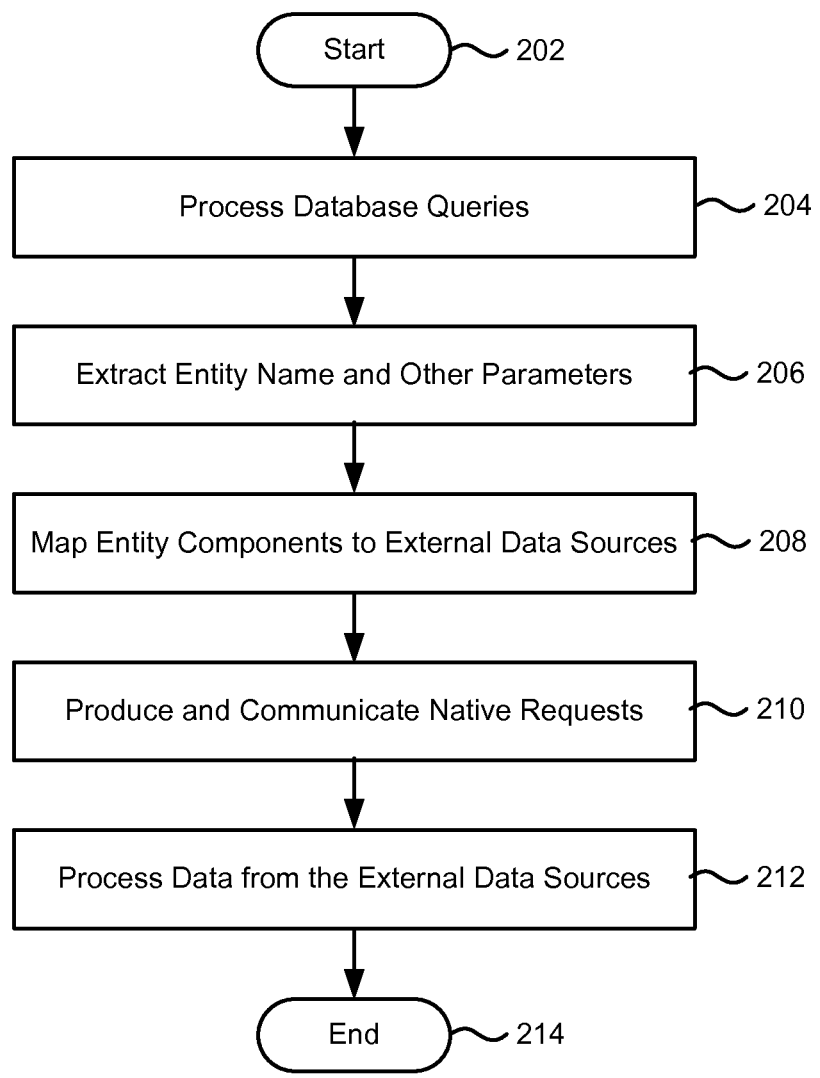
FIG. 2 is a flow diagram illustrating steps for enriching database query responses using data from external data sources according to one example implementation.

FIG. 2 is a flow diagram illustrating steps for enriching database query responses using data from external data sources according to one example implementation. Steps depicted in FIG. 2 commence at step 202 and proceed to step 204 when database queries are processed by the SQL engine 104. Step 204 represents recognition of enrichment parameters within a database query and transmission of the database query to the enrichment server 104.

Figure 6:
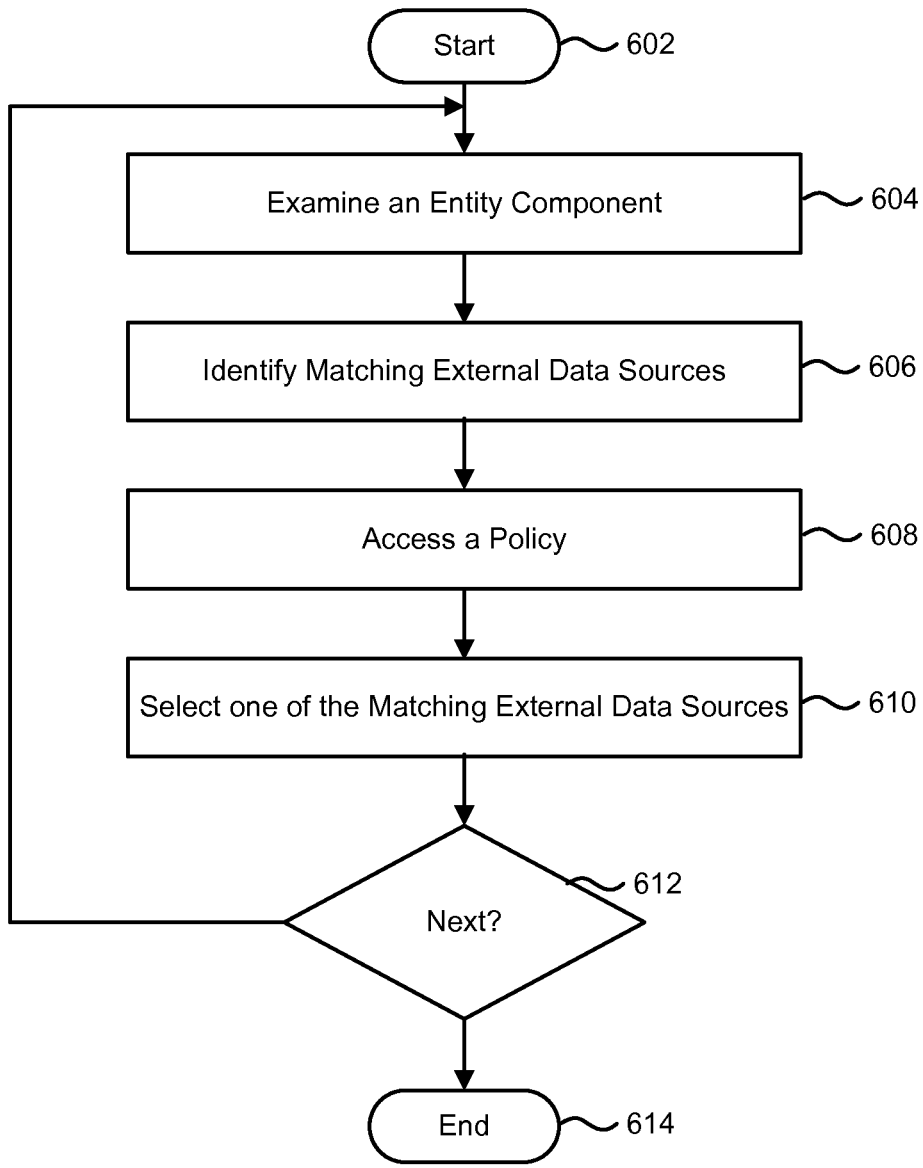
FIG. 6 is a flow diagram illustrating steps for mapping entity components to external data sources according to one example implementation.

Step 206 illustrates extraction of the enrichment parameters from the database query, which includes an entity identifier and one or more values of one or more entity components. As described herein, these entity components include data types associated with enriching the database query. Results from external data sources correspond with the one or more values as also described herein. Step 208 represents the mapping of the entity components to external data sources. One exemplary implementation of Step 208 is illustrated in FIG. 6 in which a policy determines which external data source to use for retrieving data for a particular entity component.

Figure 3:
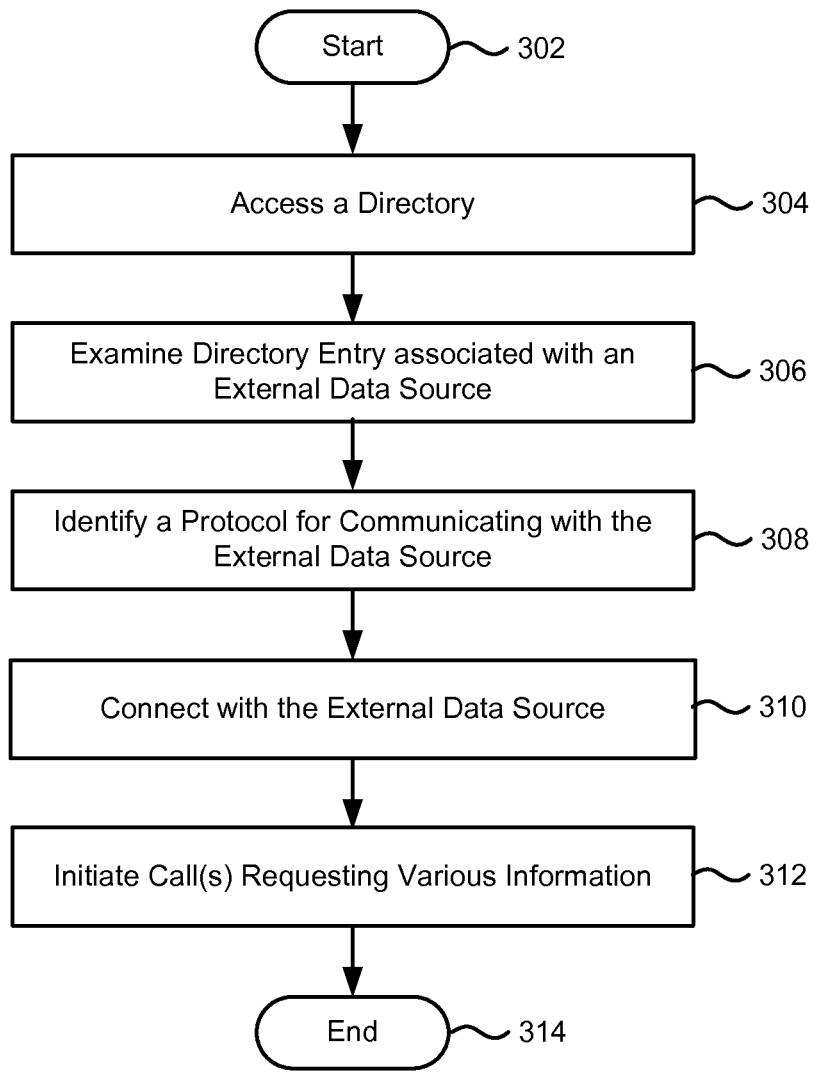
FIG. 3 is a flow diagram illustrating steps for using a directory to communicate requests for various information to an external data source according to one example implementation.

Step 210 implements the translation mechanism 106, which produces and communicates native requests for various data to the external data sources. The native requests are configured in accordance with a protocol for connecting to the external data sources, executing compatible commands and retrieving results. In one example, the native requests include native function calls that are implemented by the external data sources. FIG. 3 illustrates an exemplary implementation of Step 210 in which a directory is used to translate the database query into such native function calls requesting data for the entity components.

Step 212 is directed to processing data received from the external data sources as a response to the native requests. In one exemplary implementation, the translation mechanism 106 converts the data provided by the external data source into table data that is used to generate an enriched database query response. The enrichment server 104 communicates the enriched database query response to the SQL engine 102, which returns a view of the enriched table response and/or inserts the table data into an internal table of an internal database, e.g., according to a schema. The internal table may be refreshed automatically on a scheduled basis or the like, e.g., by automatically generating a new query for external data and using the data in the enriched data response to insert the updated data.

Optionally, the enrichment server 104 collects statistics regarding billing activity, data source diagnostics and/or the like. These statistics may be used for various purposes, such as auditing billing expenses, analyzing data sources and updating the policy. For example, the policy may include a usage limit for a particular data source. If the statistics indicate that the usage limit has been reached, another data source may be selected from the policy. Step 214 represents termination of enriching database query responses.

FIG. 3 is a flow diagram illustrating steps for using a directory to communicate requests for various information to an external data source according to one example implementation. These requests are configured to be a native command for the external data source. The enrichment server 104 uses the translation mechanism to produce these requests based on a database query that is transmitted from the SQL engine 102. Steps depicted in FIG. 3 commence at step 302 and proceed to step 304 where the enrichment server 104 accesses a directory implementing the translation mechanism 106.

Step 306 represents an examination of a directory entry associated with the external data source. Step 308 refers to identifying a protocol for communicating with the external data source. The directory entry defines a protocol for communicating data with the external data source including native function calls, data formats, billing procedures, security credentials and/or the like. Hence, such a protocol is used by the translation mechanism 106 to initiate one or more native function calls to the external data source.

Step 310 is directed to connecting with the external data source. The protocol within the directory entry also includes a location, such as an IP address, as well as any authenticating procedures for the external data source. For example, an account user name and password may be required for accessing the external data source. After establishing a session (e.g., an HTTP or HTTPS session), the translation mechanism 106 selects one or more specific databases or tables and initiates calls requesting various information as illustrated by step 312. These calls include native function calls associated with an API of the external data source. Step 314 refers to termination of using the directory to communicate requests for various information to the external data source.

Figure 4:
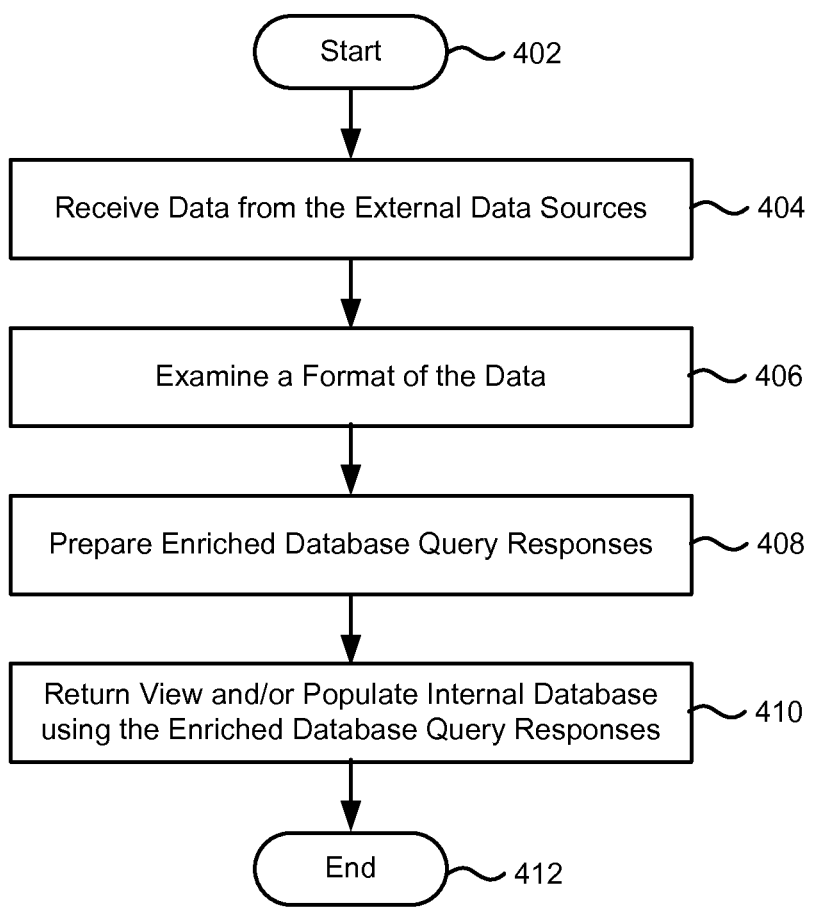
FIG. 4 is a flow diagram illustrating steps for converting data from external data sources into an enriched database query response according to one example implementation.

FIG. 4 is a flow diagram illustrating steps for converting data from external data sources into an enriched database query response according to one example implementation. Steps depicted in FIG. 4 commence at step 402 and proceed to step 404 when the translation mechanism 106 receives data from the external data sources in response to native requests for various information, such as financial or news information.

Step 406 is directed to examining a format associated with the data received from the external data sources (although the format may be known in advance from information in the directory, for example). In one exemplary implementation, a particular external data source returns values in a unique format, such as JavaScript Object Notation (JSON) format. The translation mechanism 106 converts these values into table data and prepares an enriched database query response as represented in step 408. The translation mechanism 106 may perform additional processing on these values, such as aggregating stock prices over a period of time and computing a mean or median stock price.

Step 410 is directed to returning a view of the enriched table and/or populating an internal database using the enriched database query response. Via the enrichment server 104, the table data created from the values that were returned by the particular external data source may be inserted into a certain table or one or more columns within the internal database according to one exemplary implementation. In one example, the table data shares a similar schema with the certain table rendering the insertion operation into a series of copy data operations. Alternatively, the certain table is blank or a temporary table outside of a relational paradigm associated with the internal database. Step 412 signifies a completion of the enriched database query response.

Figure 5:
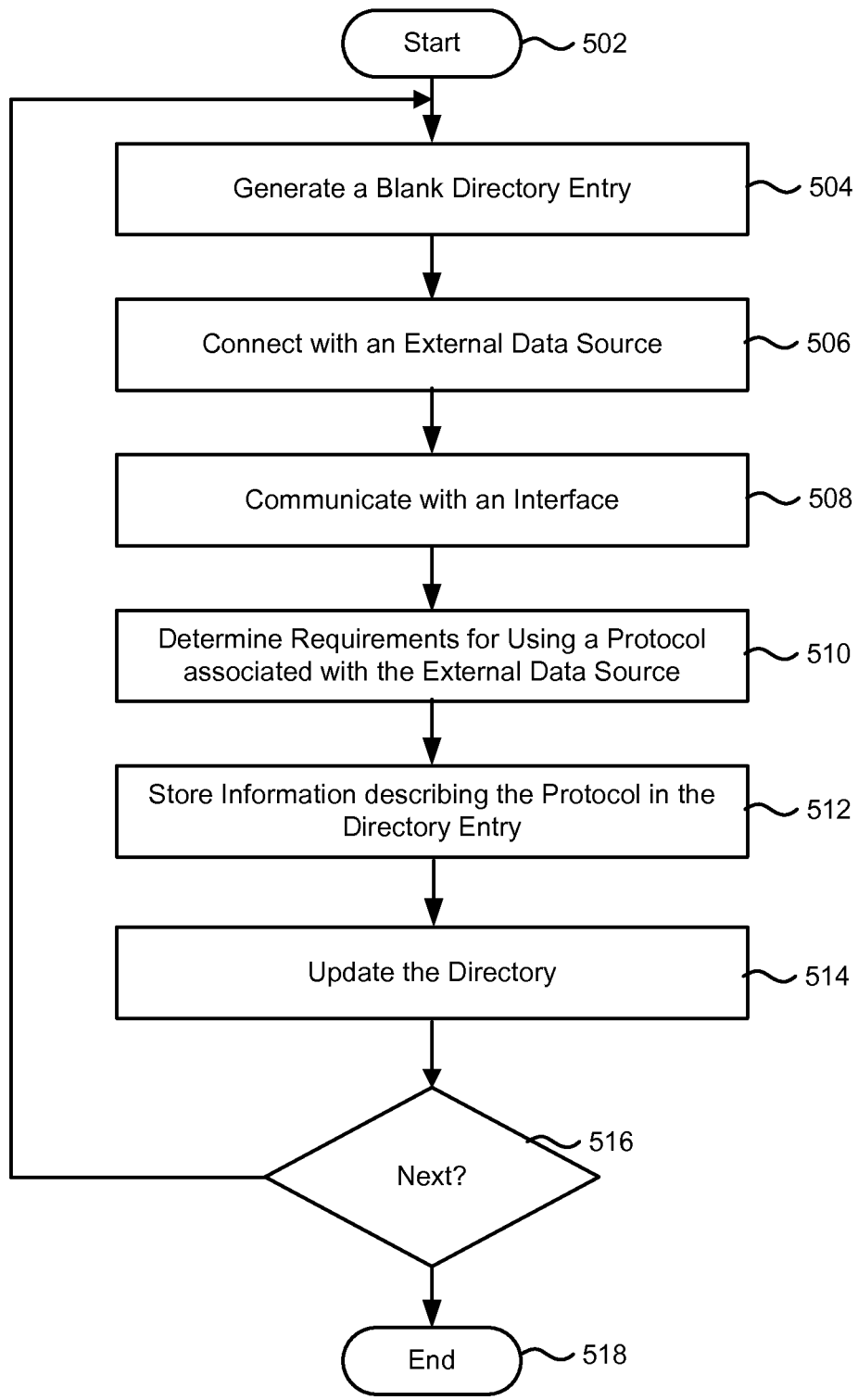
FIG. 5 is a flow diagram illustrating steps for building a directory for translating a database query into native requests for an external data source according to one example implementation.

FIG. 5 is a flow diagram illustrating steps for building a directory for translating a database query into native requests for an external data source according to one example implementation. The directory forms a portion of the translation mechanism 106. Steps depicted in FIG. 5 commence at step 502 and proceed to step 504 when the translation mechanism 106 generates a blank directory entry.

As explained further below, the translation mechanism 106 stores various information in the blank directory entry, such as a protocol for communicating with the external data source, according to one exemplary implementation. The protocol defines native functions calls for requesting information and formats for organizing the requested information. In one example, the protocol requires various credentials such as a username and password.

Step 506 is directed to connecting with the external data source. For example, the translation mechanism 106 creates a session using an IP address with an interface to the external data source, such as an Application Programming Interface (API). The translation mechanism 106 proceeds to communicate with the external data source via the interface, which is represented by step 508. In some implementations, the translation mechanism 106 uses the interface to enumerate each available database and selects an appropriate database in response to a policy as described herein.

Step 510 refers to determining requirements for using a protocol associated with the external data source. In one exemplary implementation, the translation mechanism 106 identifies functions that are executable by the interface and configured to return various information. These functions are native to the external data source and enable access to one or more available databases. The translation mechanism 106 also determines which credentials are needed to search the one or more available databases according one example. In an alternate example, the translation mechanism also determines whether a unique or propriety format is used to exchange data with the external database. Any information regarding the requirements for using the protocol is stored in the blank directory entry as represented by step 512. When complete, the directory entry is used to update the directory, which is denoted by step 514.

Step 516 represents a decision as to whether to further update the directory with another entry for a next external data source. If there are more external data sources to examine, steps 504 to 514 are repeated. If, on the other hand, there are no more external data sources to examine, step 516 is performed during which the building of the directory terminates. The directory may be rebuilt and/or updated at any appropriate time, e.g., whenever a new data source is added or changes its protocol.

FIG. 6 is a flow diagram illustrating steps for mapping entity components to external data sources according to one example implementation. Each entity component includes a data type whose value or values enrich a database query response. As mentioned in the present disclosure, a database query specifies an entity that represents a grouping of the data types. Steps depicted in FIG. 6 commence at step 602 and proceed to step 604 when the translation mechanism 106 examines an entity component.

Step 606 refers to identifying matching external data sources for the entity component. The matching external data sources are configured to provide information that corresponds with the entity component. For example, the matching external data sources provide data having a same data type as the entity component. The data provided by the matching external data sources may require further processing. As an example, such data includes values of which an algorithm uses as input parameters in order to compute another value, which is stored in the entity component.

After identifying the matching external data sources, step 608 is directed to accessing a policy for selecting an appropriate one to request various information, which is represented as step 610. In one exemplary implementation, the policy includes preferences for particular external data sources based on various factors, such as billing requirements, performance and/or the like. In one example, the policy indicates a preference for free data sources. As such, only free ones of the matching external data sources are considered options. If more than one matching external data source is free, any of them can be selected.

Step 612 represents a decision as to mapping another entity component to an appropriate external data source. If there are more entity components, the enrichment server, via the translation mechanism 106, returns to Step 604 are repeats each step until 610 for a next entity component. If, on the other hand, there are no more entity components, the mapping of the entity components terminates, which is represented by step 614.

Figure 7:
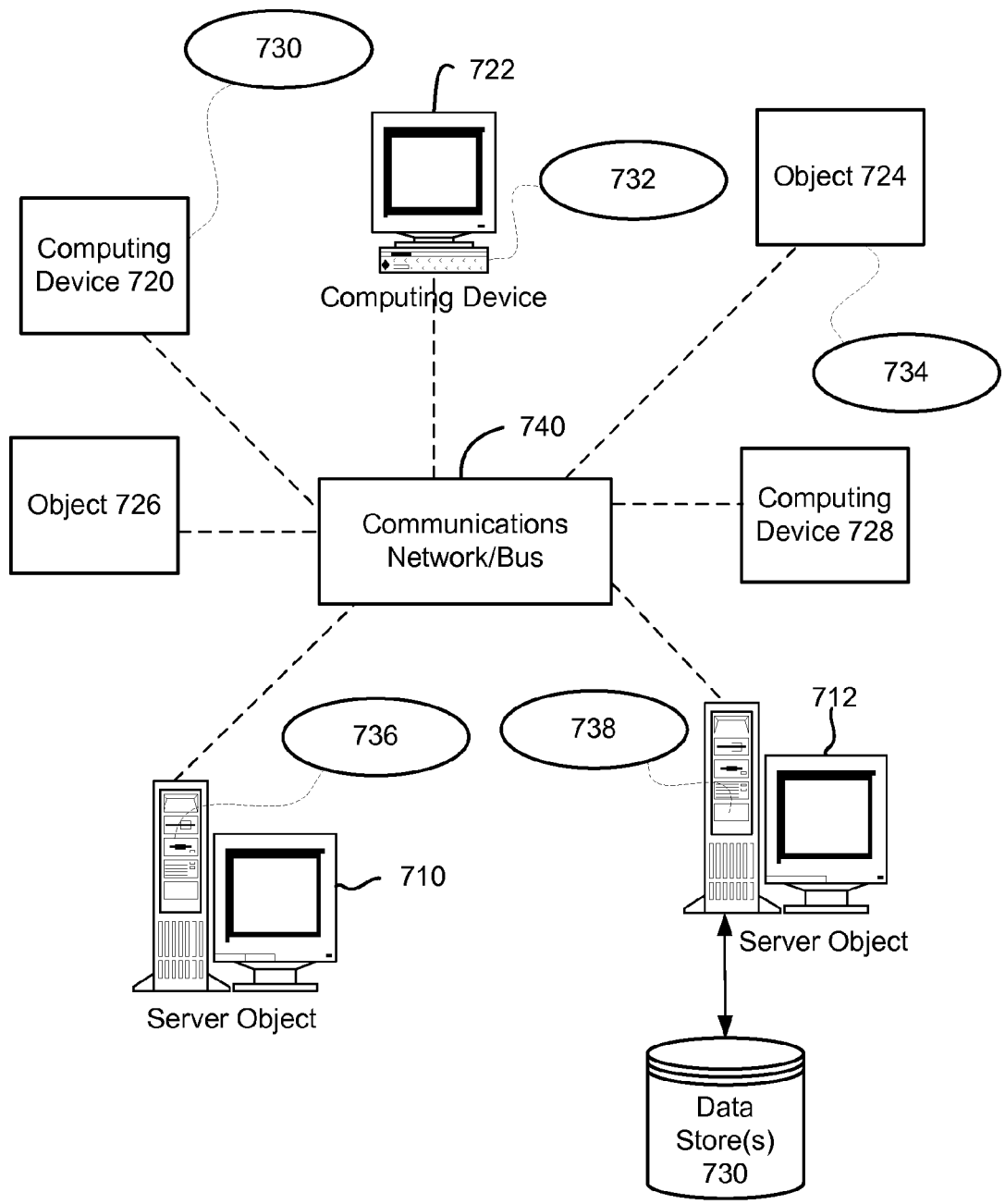
FIG. 7 is a block diagram representing exemplary non-limiting networked environments in which various embodiments described herein can be implemented.

FIG. 7 provides a schematic diagram of an exemplary networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
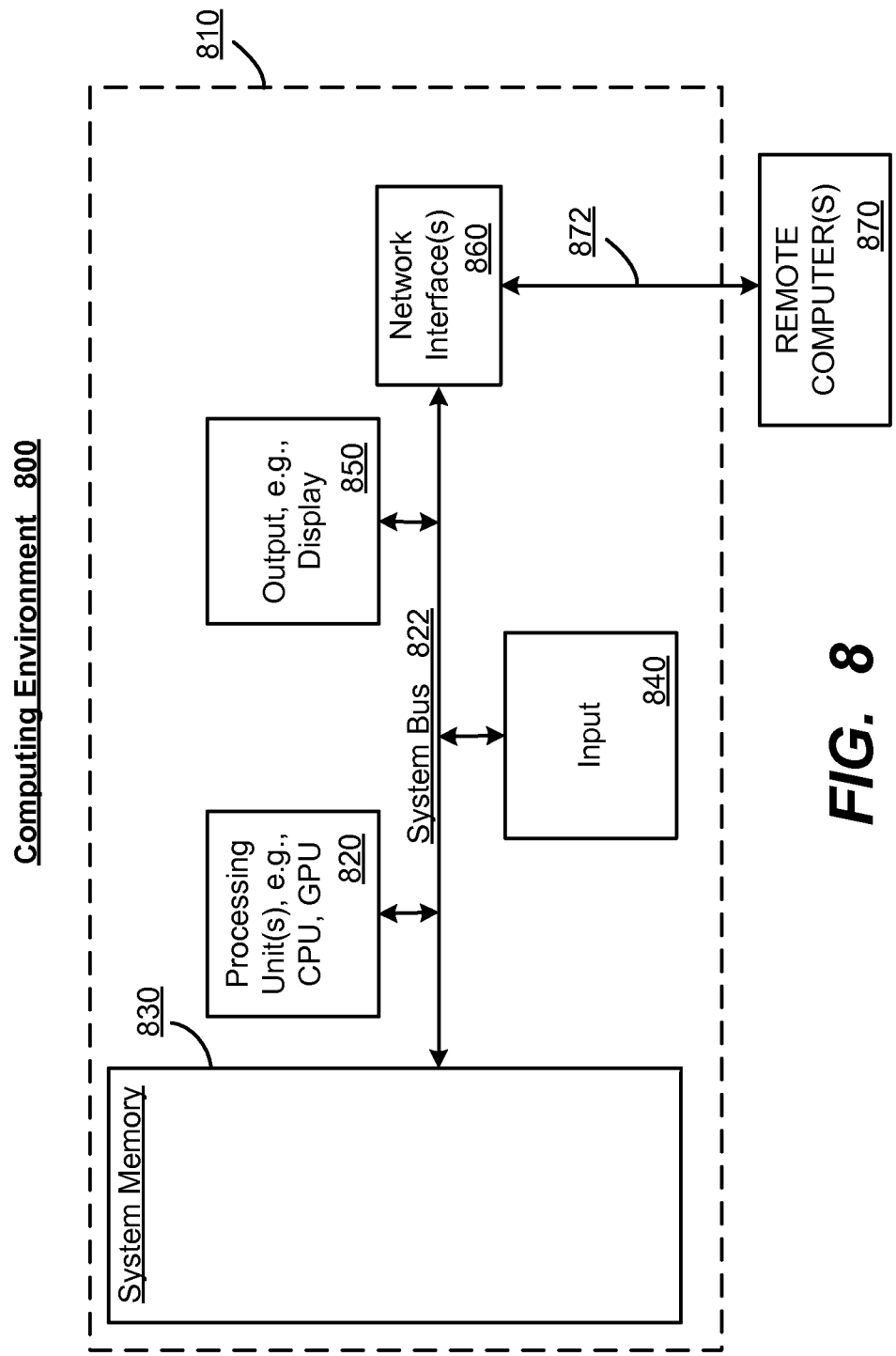
FIG. 8 is a block diagram representing an exemplary non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the exemplary computing system environment 800.

With reference to FIG. 8, an exemplary remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
   processing a database query, the database query including one or more parameters for selecting data from data sources, the one or more parameters including identified entities for which data values are to be retrieved, processing the database query including:
   determining that values for a first subset of the identified entities are available from a first database by the first subset of the identified entities corresponding to a parameter for the first database, the parameter selected from among the one or more parameters;
   determining that values for a second subset of the identified entities are unavailable from the first database by recognizing an enrichment parameter among the one or more parameters, the enrichment parameter indicating that values from the first database are to be enriched with the values for the second subset of the identified entities, the enrichment parameter further indicating that values for at least one identified entity not available from the first database is to be retrieved from the second database;

retrieving, from the first database, the values for the first subset of the identified entities corresponding to the parameter;

generating a request for retrieving values for the second subset of the identified entities from a second database in response to recognizing the enrichment parameter, the request using values for an identified entity from among the first subset of identified entities to specify what values to retrieve for the second subset of identified entities, the second database being different from the first database, wherein the generating the request comprises: identifying an express enrichment command contained in the database query, the express enrichment command identified from query language commands used to form the enrichment parameter; and translating the express enrichment command into one or more native requests, including using the enrichment parameter to identify a protocol for the second database; and producing a native request for the second database based on the protocol;

receiving values for the second subset of the identified entities parameter as a result of the request; and generating an enriched database query response to the database query, the enriched database query response including the values for the first subset of the identified entities from the first database, and including the values for the second subset of the identified data types entities from the second database.

2. The method of claim 1, wherein receiving values for the second subset of the identified entities comprises obtaining enrichment data from the second database.

3. The method of claim 2, wherein obtaining the enrichment data comprises mapping at least one entity component to at least one data source, the at least one data source selected from a plurality of data sources using a policy.

4. The method of claim 2, wherein generating the enriched database query response comprises placing the enrichment data provided by the second database into a database query response to enrich the values for the first subset of the identified entities and returning a view corresponding to the enriched database query response, or populating table data with the enriched database query response, or both.

5. The method of claim 4, wherein generating the enriched database query response comprises enriching relational database data returned in response to a database operation with enrichment data provided by at least one data source.

6. The method of claim 2, wherein processing the database query comprises extracting the enrichment parameter from the database query.

7. The method of claim 6, wherein extracting the enrichment parameter from the database query comprises extracting a parameter identifying certain values from the second database, and wherein the parameter comprises a time or location parameter, or both.

8. The method of claim 1, wherein generating a request for retrieving values for the second subset of the identified entities comprises including producing a native request based on the protocol.

9. The method of claim 8, wherein translating the express enrichment command comprises accessing an associated directory entry, wherein the associated directory entry defines the protocol for communicating with the second database and initiating the one or more native requests.

10. The method of claim 1 further comprising, connecting to the second database, identifying a protocol for communicating with the second database, and storing data associated with utilizing the protocol to retrieve the values for the second subset of the identified entities from the second database.

11. The method of claim 10, wherein storing the data associated with utilizing the protocol to retrieve the values for the second subset of the identified entities further comprises storing one or more credentials that are configured to authenticate database queries at the second database, or storing one or more formats associated with the data for the second subset of the identified data types, or both storing one or more credentials that are configured to authenticate the database queries at the second database and storing one or more formats associated with the data for the second subset of the identified data types.

12. The method of claim 10, wherein storing the data associated with utilizing the protocol to retrieve the values for the second subset of the identified entities comprises storing the data in a directory entry, wherein the directory entry is utilized to produce native requests for the second database based on the database queries.

13. In a computing environment, a system, comprising:
one or more processors; and an enrichment service configured to:
process a database query, the database query including one or more parameters for selecting data from data sources, the one or more parameters including identified entities for which data values are to be retrieved, processing the database query including:
determine that values for a first subset of the identified entities are available from a first database by the first subset of the identified entities corresponding to a parameter for the first database, the parameter selected from among the one or more parameters;
determine that values for a second subset of the identified entities are unavailable from the first database by recognizing an enrichment parameter among the one or more parameters, the enrichment parameter indicating that values from the first database are to be enriched with the values for the second subset of the identified entities, the enrichment parameter further indicating that values for at least one identified entity not available from the first database is to be retrieved from the second database;
retrieve, from the first database, the values for the first subset of the identified entities corresponding to the parameter;
generate a request for retrieving values for the second subset of the identified entities from a second database in response to recognizing the enrichment parameter, the request using values for an identified entity from among the first subset of identified entities to specify what values to retrieve for the second subset of identified entities, the second database being different from the first database, wherein the generating the request comprises: identifying an express enrichment command contained in the database query, the express enrichment command identified from query language commands used to form the enrichment parameter; and translating the express enrichment command into one or more native requests, including using the enrichment parameter to identify a protocol for the second database; and producing a native request for the second database based on the protocol;

receive values for the second subset of the identified entities parameter as a result of the request; and generate an enriched database query response to the database query, the enriched database query response including the values for the first subset of the identified entities from the first database, and including the values for the second subset of the identified data types entities from the second database.

14. The system of claim 13, wherein the enrichment service being configured to receive the values for the second subset of the identified entities comprises the enrichment service being configured to receive enrichment data from the second database; and wherein the enrichment service being configured generate an enriched database query response comprises the enrichment service being configured to combine the enrichment data with the values for the first subset of the identified entities.

15. The system of claim 13, further comprising a translation mechanism, the translation mechanism configured to: identify at least one protocol for requesting the values for the second subset of the identified entities, connect with the second database using the at least one protocol, and initiate one or more native requests based upon the protocol.

16. The system of claim 13, further comprising a directory configured to store protocol-related data for communicating with the second database, and wherein the enrichment service accesses the directory to obtain protocol-related data for communicating a native request for the values for the second subset of the identified entities.

17. The system of claim 13, wherein the enrichment service maps at least one entity component to at least one data source based on a policy.

18. A computer program product, the computer program product comprising one or more computer storage memories having stored thereon computer-executable instructions which when executed by a processor, perform the following:

process a database query, the database query including one or more parameters for selecting data from data sources, the one or more parameters including identified entities for which data values are to be retrieved, processing the database query including:

determine that values for a first subset of the identified entities are available from a first database by the first subset of the identified entities corresponding to a parameter for the first database, the parameter selected from among the one or more parameters;

determine that values for a second subset of the identified entities are unavailable from the first database by recognizing an enrichment parameter among the one or more parameters, the enrichment parameter indicating that values from the first database are to be enriched with the values for the second subset of the identified entities, the enrichment parameter further indicating that values for at least one identified entity not available from the first database is to be retrieved from the second database;

retrieve, from the first database, the values for the first subset of the identified entities corresponding to the parameter;

generate a request for retrieving values for the second subset of the identified entities from a second database in response to recognizing the enrichment parameter, the request using values for an identified entity from among the first subset of identified entities to specify what values to retrieve for the second subset of identified entities, the second database being different from the first database, wherein the generating the request comprises: identifying an express enrichment command contained in the database query, the express enrichment command identified from query language commands used to form the enrichment parameter; and translating the express enrichment command into one or more native requests, including using the enrichment parameter to identify a protocol for the second database; and producing a native request for the second database based on the protocol;

receive values for the second subset of the identified entities parameter as a result of the request; and generate an enriched database query response to the database query, the enriched database query response including the values for the first subset of the identified entities from the first database, and including the values for the second subset of the identified data types entities from the second database.

19. The computer program product of claim 18 having further computer-executable instructions which when executed perform the following:

insert at least some of the values for the second subset of the identified entities contained in the enriched database query response data into a database table in the first database.

20. The computer program product of claim 19 having further computer-executable instructions which when executed perform the following:

automatically refresh the database table on a scheduled basis with data from an automatically generated enriched database query.

* * * * *